United States Patent
Shan et al.

(10) Patent No.: US 9,214,890 B2
(45) Date of Patent: Dec. 15, 2015

(54) SPEED CONTROL OF VARIABLE-SPEED MULTIPLE-PHASE MOTORS

(75) Inventors: Ping Shan, Suzhou (CN); Cai Bing Zhang, Suzhou (CN)

(73) Assignee: Emerson Electric Co., St. Louis, MO (US)

( * ) Notice: Subject to any disclaimer, the term of this patent is extended or adjusted under 35 U.S.C. 154(b) by 824 days.

(21) Appl. No.: 13/548,560

(22) Filed: Jul. 13, 2012

(65) Prior Publication Data

US 2013/0220352 A1  Aug. 29, 2013

(30) Foreign Application Priority Data

Feb. 29, 2012  (CN) .......................... 2012 1 0050377

(51) Int. Cl.
  *H02P 27/16* (2006.01)
  *H02P 27/18* (2006.01)
  *H02M 5/293* (2006.01)

(52) U.S. Cl.
  CPC ....... *H02P 27/16* (2013.01); *H02M 2005/2937* (2013.01); *H02P 27/18* (2013.01)

(58) Field of Classification Search
  CPC . H02P 27/16; H02P 27/18; H02M 2005/2937
  See application file for complete search history.

(56) References Cited

U.S. PATENT DOCUMENTS

| | | | | |
|---|---|---|---|---|
| 4,424,024 A | * | 1/1984 | Wilson | A24B 1/02 110/205 |
| 4,710,880 A | * | 12/1987 | Zuber | B61L 25/021 246/182 C |
| 5,764,021 A | * | 6/1998 | Gutsche | 318/727 |
| 6,252,372 B1 | | 6/2001 | Arroubi et al. | |
| 6,400,119 B1 | * | 6/2002 | Garza | G05F 1/70 318/729 |
| 6,624,606 B2 | | 9/2003 | Kushida et al. | |
| 7,026,771 B2 | | 4/2006 | Kushida et al. | |
| 2004/0262284 A1 | * | 12/2004 | Gramlich | F24C 7/087 219/390 |
| 2007/0246452 A1 | * | 10/2007 | Blackson | F24C 7/087 219/400 |
| 2012/0019188 A1 | * | 1/2012 | Fukutani | H02J 3/1892 318/729 |

* cited by examiner

FOREIGN PATENT DOCUMENTS

| | | |
|---|---|---|
| CN | 1275256 A | 11/2000 |
| CN | 201523654 U | 7/2010 |
| CN | 102027294 A | 4/2011 |
| EP | 2 282 128 | 2/2011 |

OTHER PUBLICATIONS

Fairchild Semiconductor; MOC3081M, MOC3082M, MOC3083M 6-Pin Zero-Cross Optoisolators Triac Drive Output (80 Volt Peak); Sep. 2010; pp. 1-11.
On Semiconductors; MAC8D, MAC8M, MAC8N Triacs; Silicon Bidirectional Thyristors; Aug. 2004; pp. 1-7.
Chinese Office Action dated Feb. 11, 2015, issued in Chinese Patent of Invention Application No. 201200503 77.9 which the instant application claims priority to; 8 pgs.

*Primary Examiner* — Shawki S Ismail
*Assistant Examiner* — Muhammad S Islam
(74) *Attorney, Agent, or Firm* — Harness, Dickey & Pierce, P.L.C.

(57) ABSTRACT

Exemplary embodiments or implementations are disclosed of methods, apparatus, and systems for operating motors in variable speed situations. In an exemplary implementation, a method of controlling a variable-speed motor includes defining a control duration as a predetermined number of cycles of a multiple-phase power supply. Each speed in a range of speeds is defined by a corresponding number of the cycles of the control duration. Power is provided to the motor from the power supply at a selected one of the speeds, by enabling input from the power supply for the number of cycles of the control duration corresponding to the selected speed.

10 Claims, 8 Drawing Sheets

SPEED CONTROL OF VARIABLE-SPEED MULTIPLE-PHASE MOTORS

CROSS-REFERENCE TO RELATED APPLICATION

This application claims the benefit and priority of Chinese Patent of Invention Application No. 201210050377.9 filed Feb. 29, 2012. The entire disclosure of the above application is incorporated herein by reference.

FIELD

The present disclosure relates to systems and methods for speed control of variable-speed multiple-phase motors.

BACKGROUND

This section provides background information related to the present disclosure which is not necessarily prior art.

Blowers in tobacco and/or other food curing barns tend to be three-phase squirrel-cage type motors. In various phases of tobacco curing, the cubic feet per meter (CFM) needed may vary.

SUMMARY

This section provides a general summary of the disclosure, and is not a comprehensive disclosure of its full scope or all of its features.

Exemplary embodiments or implementations are disclosed of methods, apparatus, and systems for operating motors in variable speed situations. An exemplary implementation is directed to a method of controlling a variable-speed motor. In this example, a control duration is defined as a predetermined number of cycles of a multiple-phase power supply. Each speed in a range of speeds is defined by a corresponding number of the cycles of the control duration. Power is provided to the motor from the power supply at a selected one of the speeds, by enabling input from the power supply for the number of the cycles of the control duration corresponding to the selected speed.

Another exemplary implementation is directed to a method of controlling a variable-speed motor. In this example, a frequency of a multiple-phase power supply is used to define a control duration having a fixed number of cycles. Each of a plurality of speeds is defined as a corresponding number of the cycles of the control duration. Power is provided to the motor from the power supply at a selected one of the speeds, by driving a signal configured in accordance with the frequency to enable input from lines of the power supply for the number of cycles of the control duration corresponding to the selected speed.

Another exemplary embodiment is directed to a system for controlling a variable-speed motor. In this exemplary embodiment, a controller is configured to provide a driver signal in accordance with a frequency of a multiple-line, multiple-phase power supply to the motor. An interface circuit between an input and load of each line is configured to detect zero crossings in the corresponding line, and to enable or disable power through the corresponding line at the zero crossings based on the driver signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Blowers in tobacco or other food curing barns normally are three-phase squirrel cage type motors. In different phases of tobacco curing, the cubic feet per minute (CFM) needed for drying can vary. Thus, in a curing system design, a variable speed blower can be highly useful.

In various exemplary embodiments of the disclosure, full-wave cycle control is used. For example, an exemplary embodiment of a method for variable speed control of a three-phase motor uses full-wave sine control. In this example, a triac may be triggered at each Zero-Cross point. Due to the characteristic behavior of triacs, it will self-turn off at next Zero-Cross. One can select every eight (8) full sine waves as a control duration. One can control how many cycles are to be ON and the rest to be OFF. In this exemplary way, the RMS (root mean square) voltage supplied to a three-phase motor can vary from 1/8 minimum to 8/8 full output.

An exemplary embodiment of the present disclosure is directed to a method for varying the speed of a multiple-phase (e.g., three-phase motor), for example, from one up to eight stages. Although various aspects of the disclosure are described with reference to drying barns and blower motors, the disclosure is not so limited. Aspects of the disclosure may be practiced in connection with various types of variable-speed motors and various environments in which variable-speed motors may be used, such as applications that use three-phase blowers for air circulation. Further, exemplary embodiments also are contemplated in which input power may be provided in fewer than or more than three phases.

One implementation of a method of controlling a variable-speed motor includes defining a control duration as a predetermined number of cycles of a multiple-phase power supply. Each speed in a range of speeds is defined by a corresponding number of the cycles of the control duration. Power is provided to the motor from the power supply at a selected one of the speeds, by enabling input from the power supply for the number of the cycles of the control duration corresponding to the selected speed. This speed control may be provided at lower cost than inverter-type control, produces little or no harmonic noise, can reduce power consumption, and is highly reliable.

Figure 1:
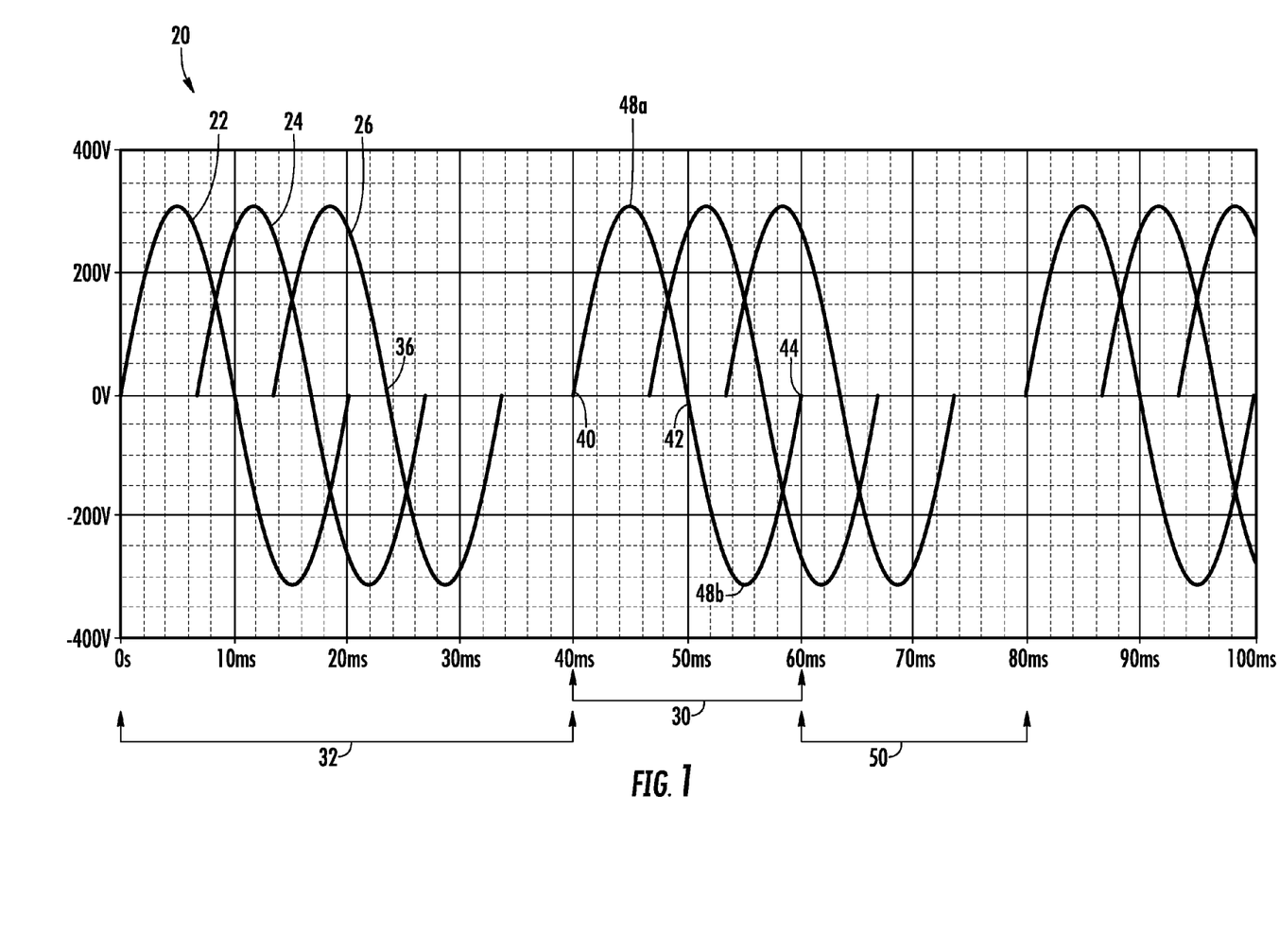
FIG. 1 is a diagram of an exemplary multiple-phase voltage signal configured in accordance with an exemplary implementation of the present disclosure.

With reference to the figures, FIG. 1 is a diagram of an exemplary multiple-phase voltage signal 20 configured in accordance with the above method. The signal 20 is obtained from a three-phase voltage input, e.g., about 240 VAC at a frequency of about 50 hertz. Accordingly, phases 22, 24, and 26 of the voltage signal 20 are separated by 120 degrees and have a frequency of 50 hertz (50 cycles per second). Thus, each full-wave cycle 30 of a phase 22, 24, and 26 lasts for twenty (20) milliseconds.

In one implementation of the disclosure, the signal 20 is driven by a motor control system driver signal as further described below. A control duration 32 is defined for the driver signal as the duration of two full-wave cycles of the power supply from which the signal 20 is obtained. Thus, the signal 20 is driven for a control duration 32 for forty (40) milliseconds. A cycle 30 of the signal 20 exhibits zero voltage crossings 36 at a beginning 40, middle 42, and end 44 of the cycle 30. Each phase of the power supply is driven to alternate between completing a full-wave cycle 30 that reaches peak voltages 48a and 48b, and a cycle 50 during which the voltage is kept at zero volts. The signal of each phase 22, 24, and 26 is repeated every two cycles. The signal 20 provides half the RMS voltage otherwise available from its three-phase power supply.

In one implementation, the motor control system, further described below, provides the signal 20 to operate a three-phase variable-speed motor. The motor could be operated at each of two speeds: at full speed in which the full alternating voltage input from the power supply is provided during both cycles of the control duration 32, or at half-speed as exhibited by the signal 20.

Figure 2:
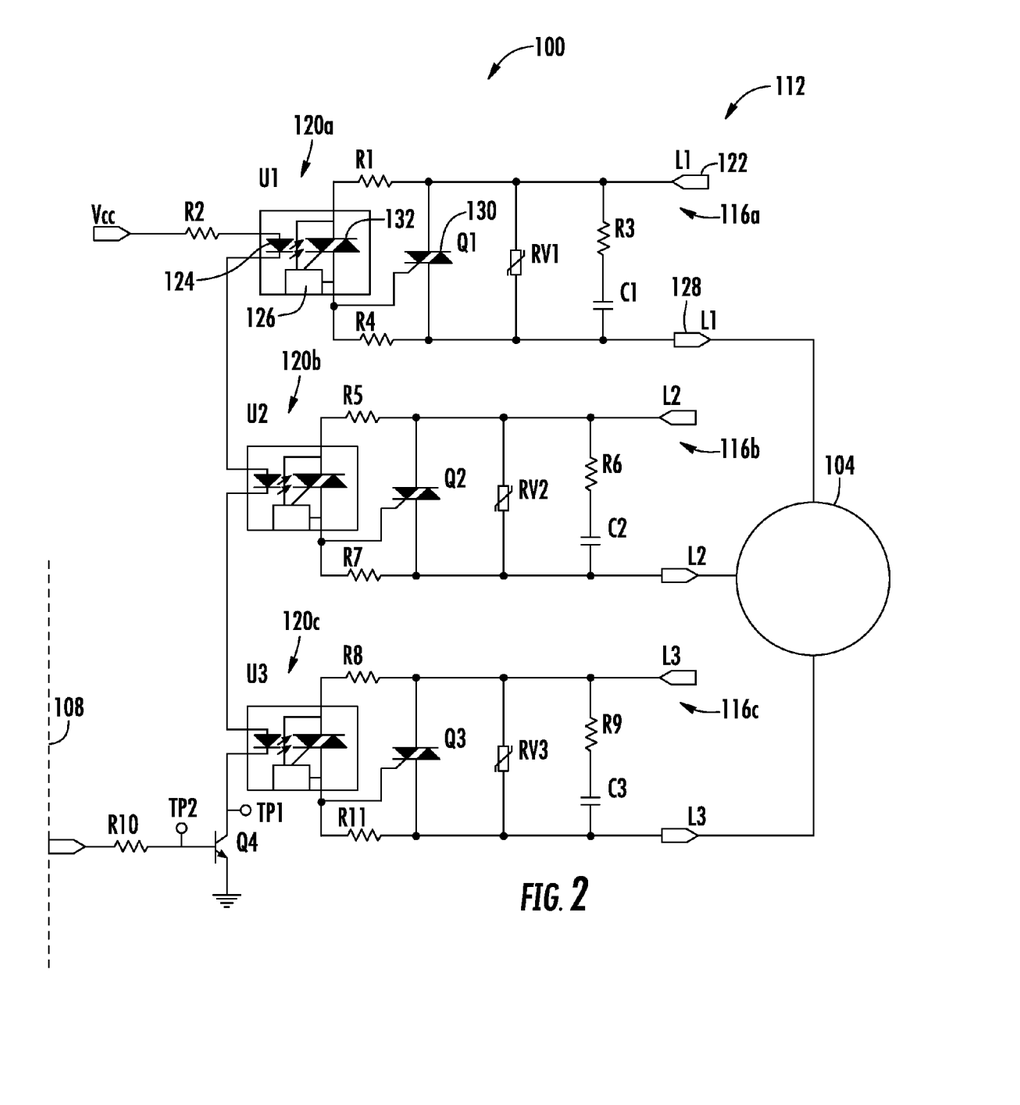
FIG. 2 is a diagram of a system for controlling a variable-speed motor in accordance with an exemplary implementation of the disclosure.

FIG. 2 is a diagram of an exemplary embodiment of a system 100 for controlling a variable-speed motor. The system 100 may be configured, e.g., to provide the voltage signal 20 shown in FIG. 1. Additionally or alternatively, the system 100 is configurable to provide various signals to provide various ranges of power and speed, e.g., to a variable-speed motor 104. The system 100 includes a controller 108, e.g., a microprocessor, computer, printed circuit board (PCB), etc., configured to provide a driver signal timed in accordance with a frequency of a three-line, three-phase power supply 112 to the motor 104. Line voltages 116a, 116b, and 116c of the power supply 112 provide power to the motor 104.

Interface circuits 120a, 120b, and 120c are provided between a voltage input 122 and load 128 of each line (116a, 116b, 116c). Each interface circuit (120a, 120b, 120c) is configured to detect zero crossings of the input voltage of the corresponding line (116a, 116b, 116c). Each interface circuit (120a, 120b, 120c) enables or disables input through the corresponding line (116a, 116b, 116c) based on the driver signal from the controller 108.

Each interface circuit (120a, 120b, 120c) includes, e.g., an opto-isolator 124, a zero crossing circuit 126, and a bidirectional switch, e.g., a triac 132 gated from the zero crossing circuit 126. The opto-isolator 124 may be, e.g., a gallium arsenide (GaAs) infrared emitting diode optically coupled with the zero crossing circuit 126, e.g., a monolithic silicon detector, to perform as a zero voltage crossing bilateral triac driver. In some embodiments the opto-isolator 124, zero crossing circuit 126, and triac 132 are provided as a unit. One such unit is a six-pin zero-cross opto-isolators triac driver output MOC3083M, available from Fairchild Semiconductor Corporation, www.fairchildsemi.com. The opto-isolators 124 of the interface circuits (120a, 120b, 120c) are connected in series with the controller 108.

The system 100 also includes bidirectional switches, e.g., power triacs 130, between the voltage input 122 and load 128 of each line (116a, 116b, 116c). The interface circuit (120a, 120b, 120c) of each line (116a, 116b, 116c) is configured to trigger the corresponding power triac 130 based on the driver signal from the controller 108 to enable or disable power through the corresponding line (116a, 116b, 116c) at zero crossings of the line voltage. In some configurations, each power triac 130 has a blocking voltage of up to 800 volts and may be, e.g., a silicon bidirectional thyristor MAC8N, available from Semiconductor Components Industries, LLC, http://onsemi.com. The controller 108 is configured to provide power to the motor 104 at each of a plurality of speeds, each speed defined by a corresponding number of cycles of a control duration of the driver signal.

Figure 3:
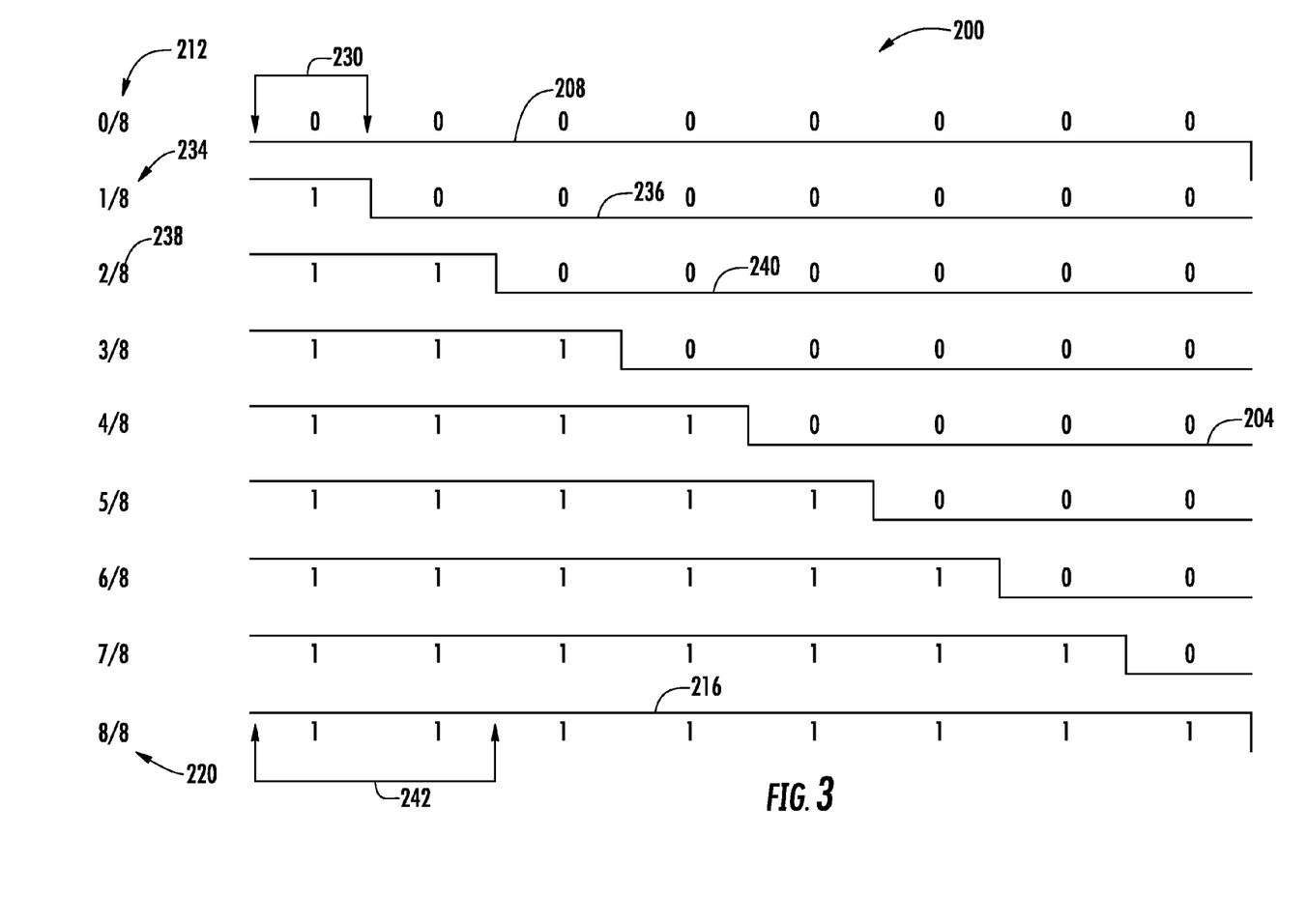
FIG. 3 is a timing diagram of driver signals that may be provided by a motor control system in accordance with an exemplary implementation of the disclosure.

In some embodiments, a control duration is eight cycles, and the speeds range from zero up to and including a full speed defined by the eight cycles of the control duration. A timing diagram showing example driver signals that could be provided, e.g., to interface circuits (120a, 120b, 120c) in one eight-cycle control duration is indicated generally in FIG. 3 by reference number 200. Driver signals 204 range from a signal 208 for zero ("0/8") speed 212 up to and including a signal 216 for full ("8/8") speed 220. For zero speed 212, the driver signal 208 is set low for each cycle 230 of the control duration. To provide a "1/8" speed 234 corresponding to one cycle of a voltage input 122, a driver signal 236 is set high for one cycle 230 and is set low for the remaining seven cycles. To provide a "2/8" speed 238 corresponding to two cycles of a voltage input 122, a driver signal 240 is set high for two cycles 242 and is set low for the remaining six cycles. In similar fashion for other speeds "3/8 through 8/8", a driver signal 204 is set high for the number of cycles corresponding to a desired speed and is set low for the remaining cycles, if any, of the control duration. Of course, in other implementations the setting of a driver signal high or low could have the opposite signification dependent, e.g., on a given interface circuit configuration. The driver signals 204 shown in FIG. 3 are exemplary only, and that various control durations less than or greater than eight cycles are possible, e.g., as discussed with reference to the signal 20 (shown in FIG. 1). Various patterns of high and low signals also are contemplated within a given control duration.

Figure 4:
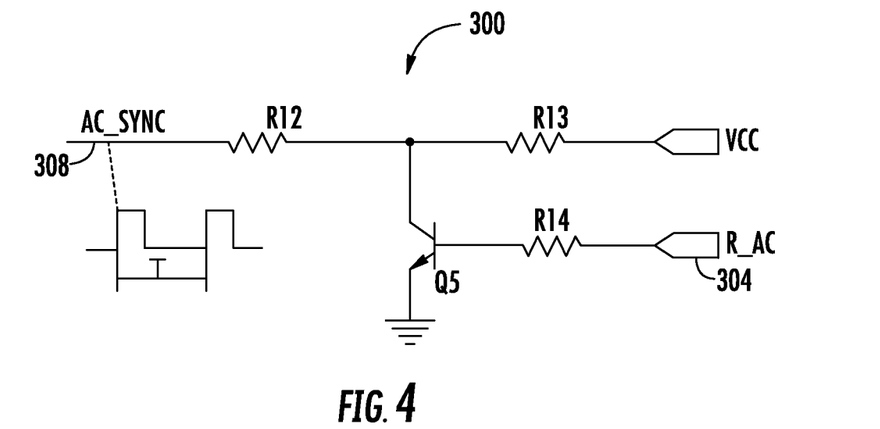
FIG. 4 is a diagram of a frequency sensor circuit of a system for controlling a variable-speed motor in accordance with an exemplary implementation of the disclosure.

Referring again to FIG. 2, the system controller 108 provides a driver signal to the interface circuits (120a, 120b, 120c) based on the frequency of the line voltage input 122. In some implementations, the controller 108 may be preconfigured, e.g., programmed with software, to provide the drive signal based on a commonly available line frequency, e.g., at 50 hertz and/or at 60 hertz. Additionally or alternatively, a frequency sensor circuit (e.g., an on board line frequency sensor circuit) may be provided. For example, FIG. 4 illustrates an exemplary embodiment of a frequency sensor circuit 300. In this example, the frequency sensor circuit 300 receives an AC signal 304 from a step-down transformer (not shown) connected with a line input voltage (116a, 116b, 116c). Such a transformer may be, e.g., a 24 VAC/60 Hz step-down transformer. The signal 304 accordingly has a lower voltage but the same frequency as that of the line voltage (116a, 116b, 116c). The sensor circuit 300 provides a square wave signal 308 at the same frequency as the line voltage (116a, 116b, 116c) to an input/output port (not shown) of the controller 108. Additionally or alternatively, line frequency may be sensed directly from the AC line voltage (116a, 116b, 116c) by using an operational amplifier proportional circuit (not shown) to reduce the voltage. The reduced voltage signal is sent through a comparator (not shown) to obtain a square wave signal to the controller 108.

Figure 5:
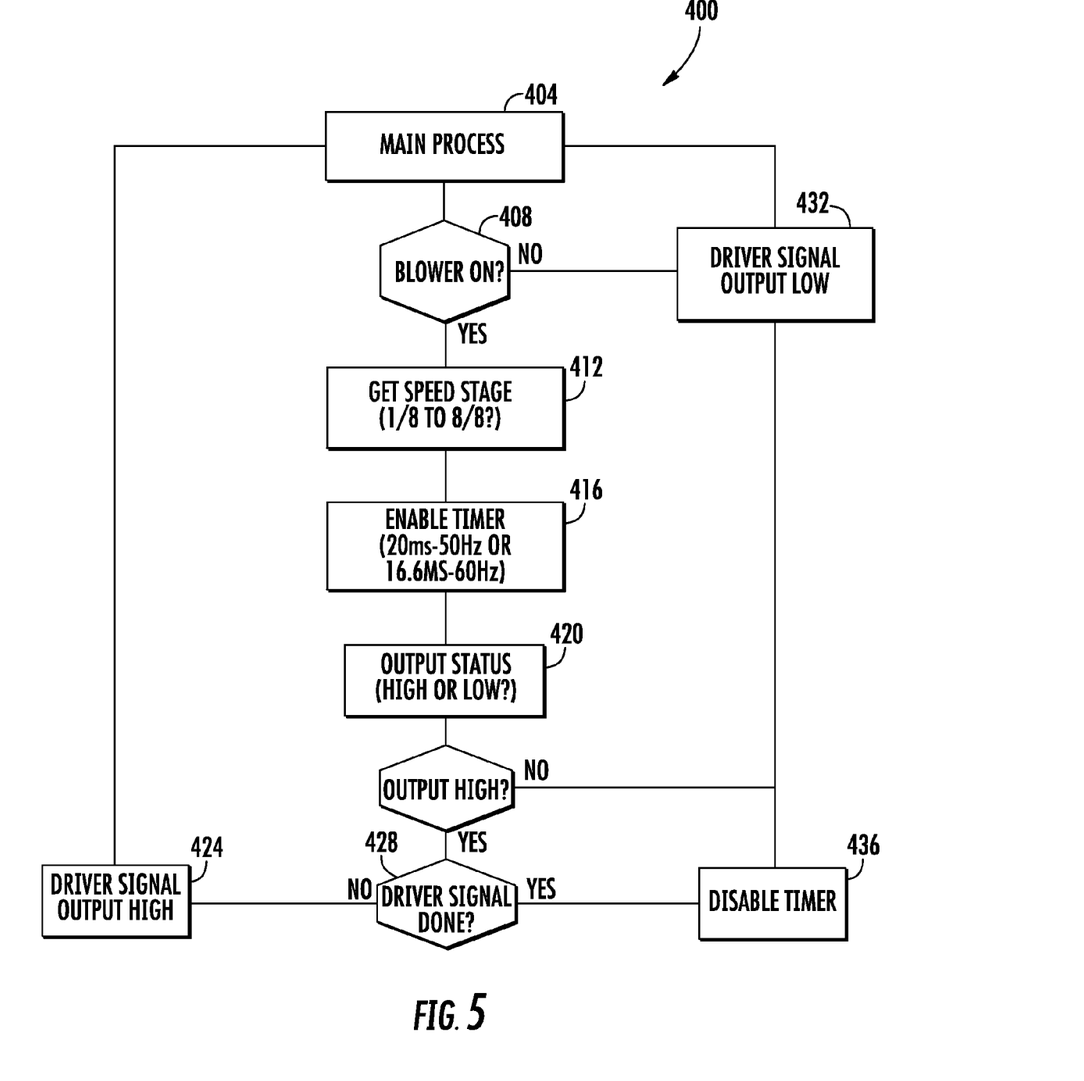
FIG. 5 is a flow diagram of a method of controlling a driver signal in accordance with an exemplary implementation of the disclosure.

A motor may be provided with power, e.g., in accordance with one implementation of a driver signal control method indicated generally in FIG. 5 by reference number 400. The method 400 includes a main process 404 performable over one control duration and that may be iteratively performed by the controller 108 to control the driver signal. Referring to FIGS. 2 and 4, if the motor 104 (FIG. 2) is switched on as indicated in process 408 (FIG. 2), then in process 412, the currently selected speed of the motor 104 is obtained. In process 416, a timer of the controller 108 is enabled to time an interval equal to the number of cycles of a line voltage (116a, 116b, 116c) of the three-phase power supply 112 corresponding to the selected speed. For example, if the speed is "2/8" and the line voltage is at 50 hertz, the timer is set to 40 milliseconds.

As indicated by process 420, the driver signal is output high or low based on the currently selected speed and the current cycle of the control duration. Continuing the same example in which the speed has been set to "2/8," if the current cycle is the first of the control duration, the driver signal is set high. On the other hand, if the current cycle is the third of the eight cycles in the current control duration, the driver signal output is low in process 420. If the driver signal is set high, it remains high, as indicated by process 424, until the high signal has lasted for two cycles, as indicated by process 428, whereupon the signal is brought low in process 432, the timer is disabled in process 436, and control returns to the main process 404

Example values for various components of the system 100 are set forth in Table 1.

TABLE 1

Figure 6:
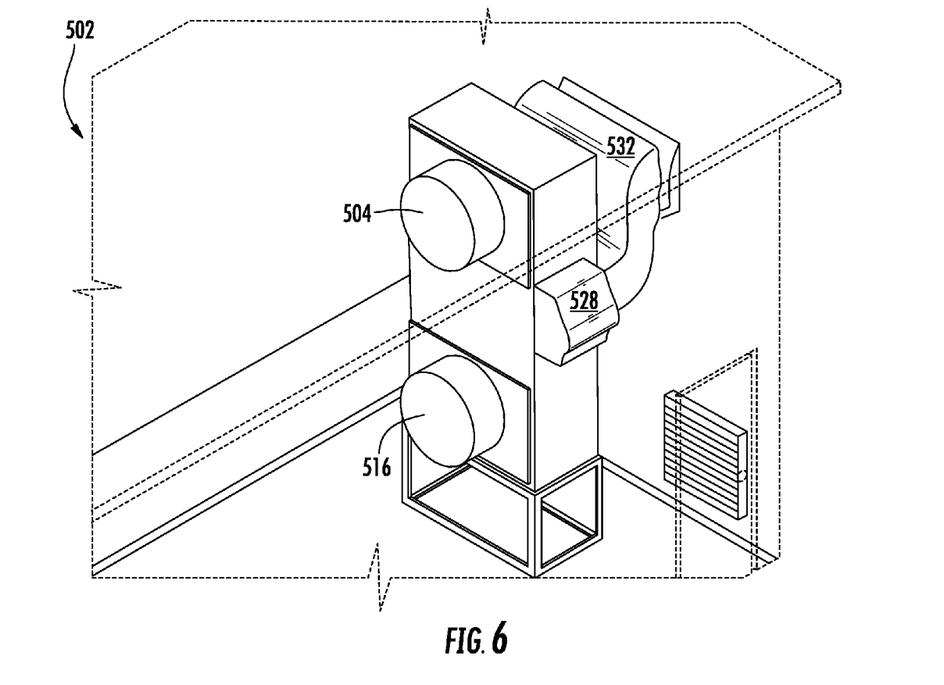
FIG. 6 is a perspective view of a drying unit in accordance with an exemplary implementation of the disclosure.
Figure 7:
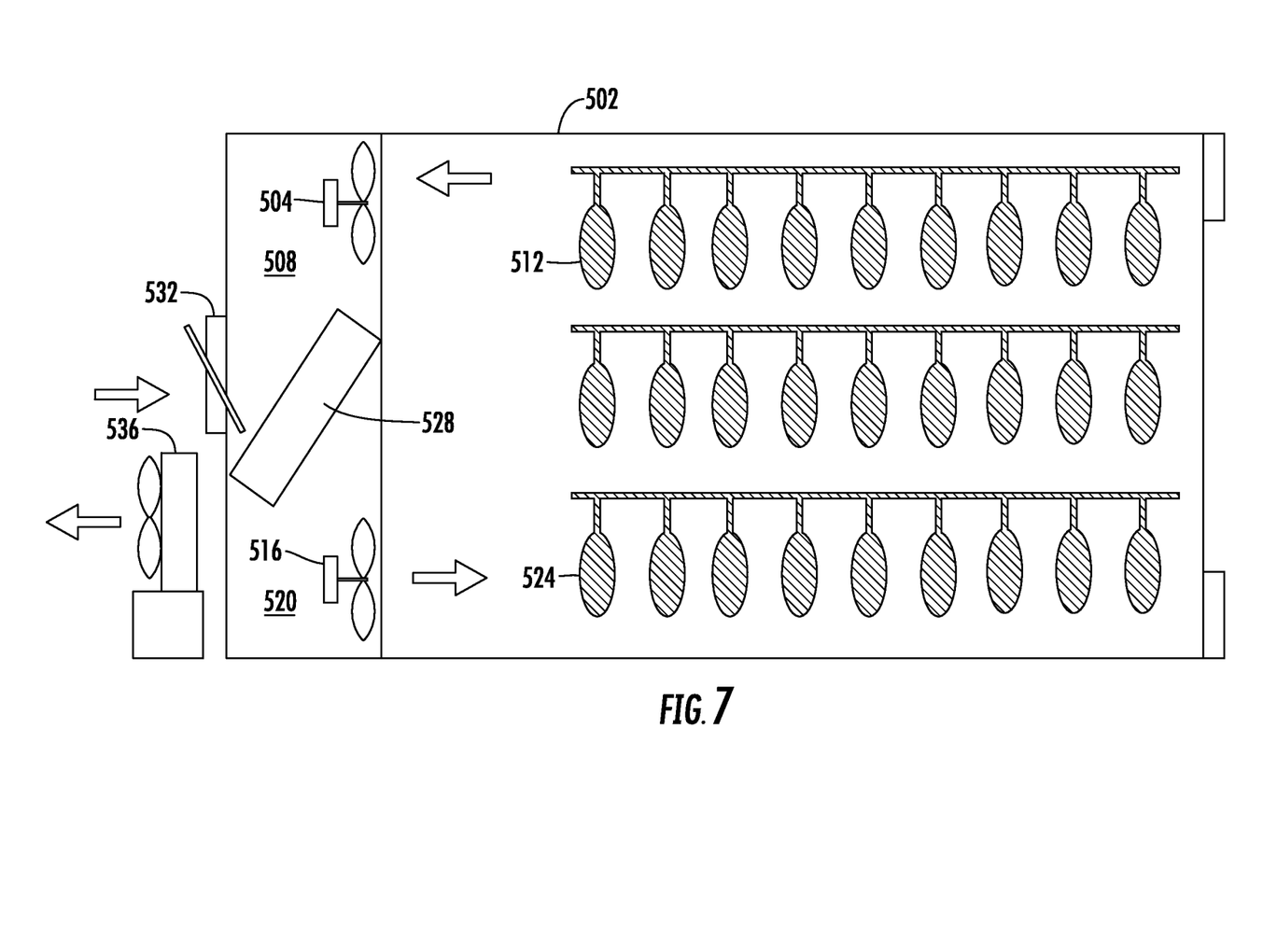
FIGS. 7 and 8 are diagrams of a drying unit in accordance with exemplary implementations of the disclosure.
Figure 8:
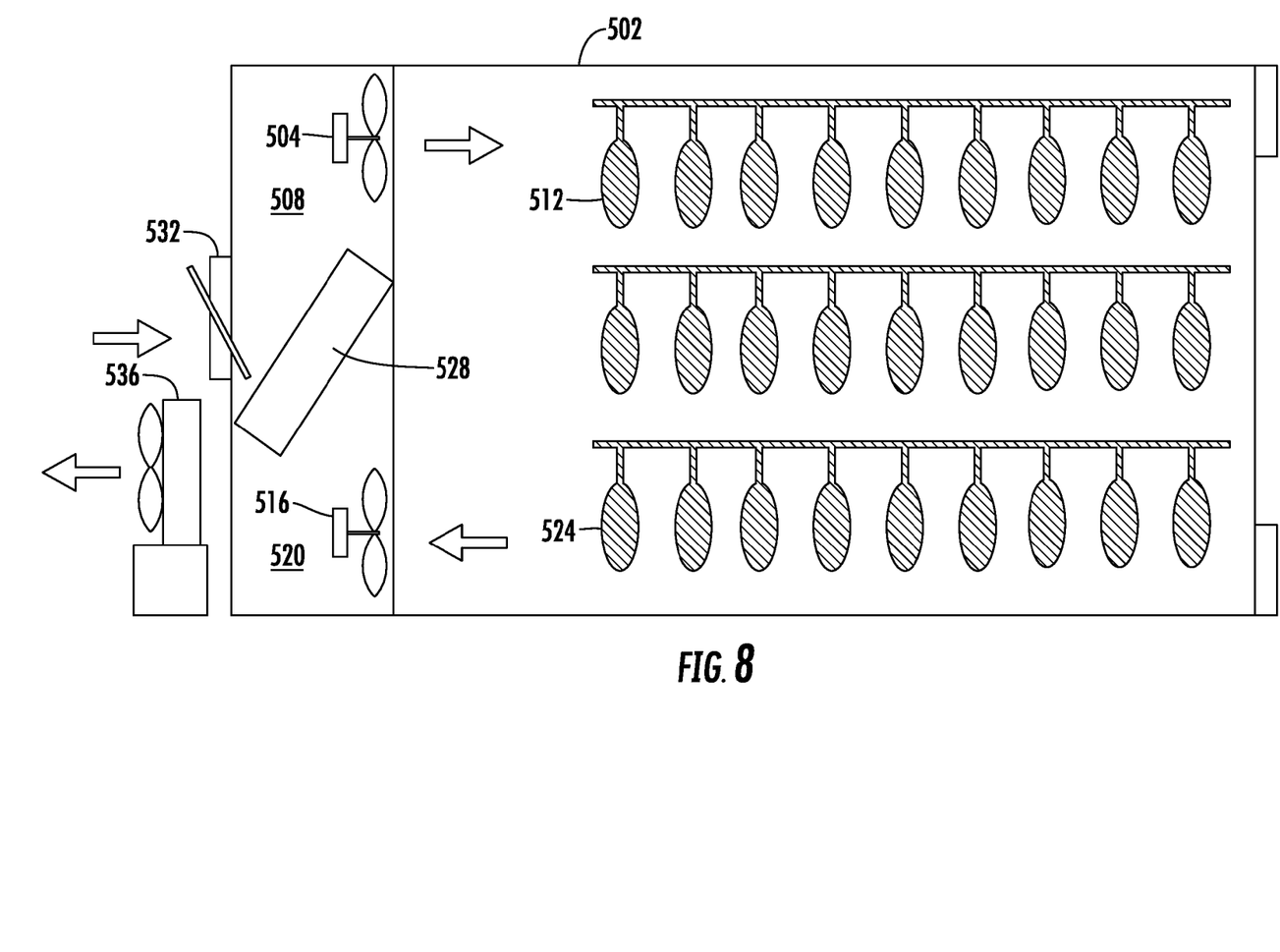

R1, R5, R8 - 360 ohms
R3, R6, R9 - 620 ohms
R4, R7, R11 - 1K ohms
R2 - 43 ohms
R10 - 10K ohms
Q4 - NPN silicon driver transistor, MMBTA06L
RV1, RV2, RV3 - 680 volts
C1, C2, C3 - 0.01 farads
Q5 - NPN amplifier, MPSA05
R12 - 100K ohms
R13 - 10K ohms
R14 - 56K ohms Based on implementations of the above motor control method, two blowers may be used in a drying unit, e.g., a curing barn. As shown in FIGS. 6 through 8, two blowers 504, 516 may be allocated in a drying unit 502. The blower 504 is at the upper side 508 for circulating air to the upper tobacco leaves 512. The blower 516 is close to the bottom 520 for better circulation to the bottom tobacco leaves 524.

A condenser 528 is placed in the middle of the drying unit 502. There is a damper 532 to suck outside fresh air for de-humidification purposes. An evaporator 536 also is provided outside the drying unit 502.

Most of the time, there may be only one blower running. The two blowers (504, 516) may in turn be switched to ON/OFF. When the upper blower 504 is running, the air will be pushed down such that the upper tobacco leaves will be close to the heat source and thus be hotter. When the bottom blower 516 is running, the air will be pushed up such that the bottom side tobacco leaves will be hotter. By doing such sequence, the inside temperature may be even (or substantially even) and motor power consumption is low.

In some extreme conditions like leaf rib drying, the CFM needed can be very high. A reverse running capability can be added. For example, a 3-phase motor may be reversed by reversing any two of the phases. The two blowers (504, 516) can be ON at the same time, but one blower will be push, while the other is pull. The two motors can be fully utilized to maximize the CFM.

By way of example only, exemplary embodiments of methods and systems disclosed herein may provide one or more of the following advantages over other ways of controlling and varying motor speed:

Low cost: Cost of triac based variable speed control is lower than inverter type control; and/or No harmonic noises: Zero-cross triggering method together with full sine wave control; and/or Power saving: 8 stage speed variation with reverse running logic can reduce the blower power consumption; and/or Higher reliability: Compared to inverter and random trigger type triac control method, exemplary embodiments of this disclosure may be less complex and robust.

The above mentioned possible advantages are provided for purposes of illustration only, and do not limit the scope of the present disclosure. Exemplary embodiments of methods and systems disclosed herein may provide one or more of the above advantages, all of the above advantages, none of the above advantages, or combinations thereof.

In accordance with aspects of the present disclosure, exemplary embodiments are disclosed of methods and apparatus for operating a motor (e.g., AC motor) in a variable speed situation using a step-wise method of control. In an exemplary embodiment, a method includes determining the frequency of the AC power (e.g., 50 or 60 hertz), then determining a base unit of time based on the period of the frequency. After the base unit of time is determined, it is multiplied by a whole number (8 in this example) to get the operational time period. Then to operate the motor at lowest speed, the drive circuit is enabled for 1/8 of the total time period. For full speed, the drive circuit is enabled for 8/8 of the total time period. For example, if line frequency is 50 hertz, then the base time period would be 0.020 seconds, and the total operational period would be 0.160 seconds for 8 segments. The frequency forms the basis for operation in this example as the drive circuitry is triggered by zero crossing of the AC waveform. Also in this example, three drive circuits may be used to create a variable speed AC motor control, enabling the drive circuit using the frequency to generate a base time period for operation. The circuit in this example may sense the operational frequency, and then determine the units it will use to operate the circuit in the manner described above. In an exemplary embodiment of a system or apparatus for operating a motor (e.g., AC motor) in a variable speed situation, a system may include one or more phase circuits each of which is enabled as a function of time derived arbitrarily from the frequency.

In an exemplary embodiment, a method of controlling a variable-speed motor includes defining a control duration as a predetermined number of cycles of a multiple-phase power supply; defining each speed in a range of speeds by a corresponding number of the cycles of the control duration; and providing power to a motor from the multiple-phase power supply at a selected one of the speeds, by enabling input from the multiple-phase power supply for the number of the cycles of the control duration corresponding to the selected speed. Also in this example, enabling the power input from the multiple-phase power supply may comprise driving a signal to switch input from lines of the multiple-phase power supply between "on" and "off" states at zero-crossing points of the cycles of the multiple-phase power supply. The method may also further comprise, for the control duration, causing input from the lines to be in the "on" state only for the number of the cycles of the control duration corresponding to the selected speed. The cycles may be full-wave cycles; and/or the control duration may be defined as eight cycles of the power supply; and/or the method may further comprise determining the duration of the cycles of the power supply; and/or the motor may be included in a blower. The method may be performed to control motors of first and second blowers where the first blower is positioned above the second blower inside a drying unit in which a condenser is positioned between the first and second blowers and a damper is configured to admit air into the drying unit. The method may further comprise alternating operation of the first and second blowers to alternate a direction of circulation in the drying unit; and/or substantially simultaneously operating one of the first and second blowers in a forward direction and the other one of the first and second blowers in a reverse direction.

In another exemplary embodiment, a method of controlling a variable-speed motor includes using a frequency of a multiple-phase power supply to define a control duration having a fixed number of cycles; defining each of a plurality of speeds as a corresponding number of the cycles of the control duration; and providing power to a motor from the multi-phase power supply at a selected one of the plurality of speeds, by driving a signal configured in accordance with the frequency to enable input from lines of the multi-phase power supply for the number of cycles of the control duration corresponding to the selected speed. The cycles may be full-wave cycles; and/or the control duration may be defined as eight cycles of the power supply; and/or the method may further comprise determining the duration of the cycles of the power supply; and/or the motor may be included in a blower. The method may be performed to control motors of first and second blowers where the first blower is positioned above the second blower inside a drying unit in which a condenser is positioned between the first and second blowers and a damper is configured to admit air into the drying unit. The method may further comprise alternating operation of the first and second blowers to alternate a direction of circulation in the drying unit; and/or substantially simultaneously operating one of the first and second blowers in a forward direction and the other one of the first and second blowers in a reverse direction.

In another exemplary embodiment, a system for controlling a variable-speed motor includes a controller configured to provide a driver signal configured in accordance with a frequency of a multiple-line, multiple-phase power supply to a motor. The system also includes an interface circuit between an input and load of each line. Each interface circuit is configured to detect zero crossings in the corresponding line, and to enable or disable power through the corresponding line at the zero crossings based on the driver signal. The controller may be further configured to provide power to the motor at each of a plurality of speeds, with each speed defined by a corresponding number of cycles of a control duration of the driver signal. The control duration may comprise eight cycles; and the speeds may range from a zero speed up to and including a full speed defined by the eight cycles of the control duration. The system may further comprise a bidirectional switch between the input and load of the corresponding line, and the interface circuit may be further configured to enable or disable power through the corresponding line at the zero crossings by triggering the bidirectional switch. The system may be configured to control a motor of a blower. The system may be operable for controlling a motor of at least one blower associated with or included in a tobacco curing barn. The tobacco curing barn may include first and second blowers with the first blower positioned above the second blower inside a drying unit in which a condenser is positioned between the first and second blowers and a damper is configured to admit air into the drying unit. The system may be operable for controlling motors of the first and second blowers, including alternating operation of the first and second blowers to alternate a direction of circulation in the drying unit; and/or substantially simultaneously operating one of the first and second blowers in a forward direction and the other one of the first and second blowers in a reverse direction.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used, etc.) and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling a variable-speed motor, the method comprising:
    defining a control duration as a predetermined number of cycles of a multiple-phase power supply;
    defining each speed in a range of speeds by a corresponding number of the cycles of the control duration; and
    providing power to a motor from the multiple-phase power supply at a selected one of the speeds, by enabling an input from the multiple-phase power supply for the number of the cycles of the control duration corresponding to the selected speed;
    wherein:
        the method is performed to control motors of first and second blowers, the first blower positioned above the second blower inside a drying unit in which a condenser is positioned between the first and second blowers and a damper is configured to admit air into the drying unit; and
        the method further comprises:
            alternating operation of the first or second blowers to alternate a direction of circulation in the drying unit; and/or
            substantially simultaneously operating one of the first or second blowers in a forward direction and the other one of the first and second blowers in a reverse direction.

2. The method of claim 1, wherein enabling the input from the multiple-phase power supply comprises driving a signal to switch the input from lines of the multiple-phase power supply between "on" and "off" states at zero-crossing points of the cycles of the multiple-phase power supply.

3. The method of claim 2, further comprising, for the control duration, causing the input from the lines to be in the "on" state only for the number of the cycles of the control duration corresponding to the selected speed.

4. The method of claim 1, wherein:
    the cycles are full-wave cycles; and/or
    the control duration is defined as eight cycles of the power supply; and/or
    the method further comprises determining the duration of the cycles of the power supply; and/or
    the motor is included in a blower.

5. A method of controlling a variable-speed motor, the method comprising:
    using a frequency of a multiple-phase power supply to define a control duration having a fixed number of cycles;
    defining each of a plurality of speeds as a corresponding number of the cycles of the control duration; and
    providing power to a motor from the multi-phase power supply at a selected one of the plurality of speeds, by driving a signal configured in accordance with the frequency to enable an input from lines of the multi-phase power supply for the number of cycles of the control duration corresponding to the selected speed;
    wherein:
        the method is performed to control motors of first and second blowers, the first blower positioned above the second blower inside a drying unit in which a condenser is positioned between the first and second blowers and a damper is configured to admit air into the drying unit; and
        the method further comprises:
            alternating operation of the first or second blowers to alternate a direction of circulation in the drying unit; and/or
            substantially simultaneously operating one of the first or second blowers in a forward direction and the other one of the first or second blowers in a reverse direction.

6. The method of claim 5, wherein:
    the cycles are full-wave cycles; and/or
    the control duration is defined as eight cycles of the power supply; and/or
    the method further comprises determining the duration of the cycles of the power supply; and/or
    the motor is included in a blower.

7. A tobacco curing barn including at least one blower having a motor controlled by a system for controlling a variable-speed motor, the system comprising:
    a controller configured to provide a driver signal configured in accordance with a frequency of a multiple-line, multiple-phase power supply to a motor; and
    an interface circuit between an input and load of each line, each interface circuit configured to detect zero crossings in the corresponding line, and to enable or disable power through the corresponding line at the zero crossings based on the driver signal;

wherein:
the at least one blower comprises first and second blowers, the first blower positioned above the second blower inside a drying unit in which a condenser is positioned between the first and second blowers and a damper is configured to admit air into the drying unit; and
the system is operable for controlling motors of the first and second blowers, including:
alternating operation of the first or second blowers to alternate a direction of circulation in the drying unit; and/or
substantially simultaneously operating one of the first or second blowers in a forward direction and the other one of the first or second blowers in a reverse direction.

8. The tobacco curing barn of claim 7, wherein the controller is further configured to provide power to the motor at each of a plurality of speeds, each speed defined by a corresponding number of cycles of a control duration of the driver signal.

9. The tobacco curing barn of claim 7, further comprising a bidirectional switch between the input and load of the corresponding line, the interface circuit further configured to enable or disable power through the corresponding line at the zero crossings by triggering the bidirectional switch.

10. The tobacco curing barn of claim 8, wherein:
the control duration comprises eight cycles; and
the speeds range from a zero speed up to and including a full speed defined by the eight cycles of the control duration.

\* \* \* \* \*